(12) United States Patent
Desai

(10) Patent No.: US 7,069,497 B1
(45) Date of Patent: Jun. 27, 2006

(54) SYSTEM AND METHOD FOR APPLYING A PARTIAL PAGE CHANGE

(75) Inventor: Sachin Desai, San Francisco, CA (US)

(73) Assignee: Oracle International Corp., Redwood Shores, CA (US)

( * ) Notice: Subject to any disclaimer, the term of this patent is extended or adjusted under 35 U.S.C. 154(b) by 597 days.

(21) Appl. No.: 10/241,732

(22) Filed: Sep. 10, 2002

(51) Int. Cl.
*G06F 17/00* (2006.01)

(52) U.S. Cl. ............... 715/501.1; 715/513; 715/524

(58) Field of Classification Search ............ 715/500.1, 715/501.1, 513, 524
See application file for complete search history.

(56) References Cited

U.S. PATENT DOCUMENTS

| | | | |
|---|---|---|---|
| 6,931,397 B1 * | 8/2005 | Sundaresan ................... 707/5 |
| 2002/0032701 A1 * | 3/2002 | Gao et al. .................... 707/513 |
| 2004/0093376 A1 * | 5/2004 | De Boor et al. ............ 709/203 |

* cited by examiner

Primary Examiner—Stephen Hong
Assistant Examiner—Matthew Ludwig
(74) Attorney, Agent, or Firm—Park, Vaughan & Fleming LLP

(57) ABSTRACT

A system and method for applying a partial page change to a browser page formatted according to Hypertext Markup Language (HTML). In response to an update request, a first client browser page is updated to a second page by applying one or more partial page changes to the first page, wherein each change comprises an HTML element. Each change may comprise an element unique to the second page or an element that differs from a corresponding element of the first page. A set of changes may comprise a partial page update. In one embodiment of the invention, an origin server may be expressly programmed to receive the update request and serve a partial page update. In another embodiment of the invention, a caching server is configured to generate the partial page update by comparing hash values computed on corresponding elements of the first page and the second page.

11 Claims, 7 Drawing Sheets

SYSTEM AND METHOD FOR APPLYING A PARTIAL PAGE CHANGE

BACKGROUND

This invention relates generally to the field of computer systems. More particularly, a system and methods are provided for applying a partial page change to a browser page formatted according to Hypertext Markup Language (HTML) or another browser interpretable format.

In a typical browser page, descriptive 'markup' codes, commonly referred to as tags, delineate, identify, and organize entities of a page into a hierarchical structure of HTML elements. Each element may contain browser-displayable text, one or more hyperlink references to other pages, a table, an image, or some other type of content.

Usually, a tag delimits an HTML element by positioning page content between a matched 'starting' and 'ending' tag pair. A tag may define a block-level element of a page (e.g., a table, a paragraph), a higher-level structure element of a page (e.g., a body, or a head) or a lower-level inline element (e.g., a font change or a line break).

For example, a table may be delineated in HTML with a beginning tag <TABLE> and an ending tag </TABLE>. Further, each row within a table may be delineated with a <TR> and </TR> tag pair, and each table row may comprise one or more data cells, each of which may be delineated with a <TD> and </TD> tag pair. A data cell element delineated by a matching pair of <TD> and </TD> tags may comprise one or more other elements, including another table.

As illustrated in the table example above, HTML element tags are typically hierarchically nested in a document, often many levels deep; however, a tag pair/element in a properly constructed HTML document never overlaps another tag pair/element. Stated alternatively, an inner element, (e.g., a table row), is always contained completely within an outer element, (e.g., a table).

Each HTML element may comprise an associated identifier attribute, sometimes referred to as a tag identifier. An identifier may be associated with a single element, or it may be associated with an element containing a group or set of elements. A browser, when displaying a page, may use an identifier to locate an element within an HTML document hierarchy. Or, a script, executing in a browser, may use an identifier to reference a particular element.

An <HTML> element constitutes the top-most element of a page. It typically comprises a <HEAD> element and a <BODY> element. The <HEAD> element may comprise information concerning the page, such as a page title, a page description, and a page script type (e.g., JavaScript™).

Displayable content of a page is usually delimited by a <BODY> element, which typically includes one or more block-level and/or inline elements. Often, a majority of the browser-displayable content within a body element of a page comprises one or more tables.

Generally, a block-level element may contain inline elements as well as other block-level elements; therefore, a block-level element is usually larger in size than an inline element. Normally, inline elements contain data (e.g., text) and other inline elements. In particular, an 'anchor' (<A>) inline element often comprises a hyperlink defining a reference between a source anchor (i.e., the source of the anchor element, usually the current HTML page/browser) and a destination anchor, typically a Uniform Resource Locator (URL) to another HTML page. A source anchor may refer to a location where a hyperlinked page is to be sent, typically by a server, when the hyperlink is selected.

In one type of existing page browsing system, a client browser may submit a request for a page to an origin server, such as a web server, when a hyperlink is selected. In response to the page request, which may comprise a Uniform Resource Locator (URL), the origin server typically generates the page identified by the request and returns the requested page to the client browser.

Another system comprises a caching server configured to receive page requests from a client browser and to communicate with an origin server. When a page request is received, it is compared against currently cached pages and/or previous page requests. If the requested page is found, the caching server serves it to the client browser. If the requested page is not found, the caching server may retrieve the page from the origin server, store it in a cache using the URL identified in the page request as a key, and serve the page to the client browser.

In either of these systems, content of an entire page is transmitted, either directly from an origin server or via a caching server, to a client browser in response to a page request.

For example, a first page displayed in a client browser may comprise a page of a financial web site that accepts a stock ticker symbol as a parameter for a current stock quote search. In response to a request for a quote search, the client browser may retrieve and display a second page comprising a quote for the specified stock. The newly displayed second page may also include other elements, such as a site menu bar, a banner advertisement and/or other content common to both the first page and the second page.

In this example, all the displayable and non-displayable elements of the second page, including elements indistinguishable from corresponding elements of the first page, such as the site menu bar, are transferred to the client browser when the first page is updated to the second page.

Even though the difference between a first page and a second page may constitute only a minor change, such as a table element comprising a current stock quote, it is common behavior in today's browsing environments for the full content of a second page to be transmitted to a client browser in response to an update request by a first page. As a result, a client browser may appear unresponsive or sluggish while retrieving and displaying a requested page.

Many modern browsers wait until all of the elements of a requested page are received before displaying the page. As a result, a browser may flicker or display a blank page for a significant period of time, especially if the requested page comprises a large number of elements and/or nested elements (e.g., tables within tables). Such a display disruption may diminish a browsing experience.

In addition, an origin server or caching server may more easily become overburdened while attempting to satisfy a browser page request, due to client browsers retrieving redundant page elements when navigating from one page to another.

SUMMARY

In one embodiment of the invention, a system and methods are provided for facilitating a partial page change to a first browser page in a client browser.

In this embodiment of the invention, a partial page change comprises an HTML element of a second page that differs from a corresponding element of the first page. Another partial page change may comprise an HTML element of a second page that has no corresponding element in the first page (i.e., an element unique to the second page). The partial page change may be retrieved in response to a request for a partial page update that, when applied to the first page, updates the first browser page to the second page. A partial page update may therefore comprise multiple partial page changes.

The first browser page may include one or more browser-executable script library functions that, when executed by a client browser, enable the first browser page to request a partial page update, and to subsequently apply the update.

In this embodiment, each HTML element of the first page is associated with a tag identifier, and each element of the partial page update may also be associated with a tag identifier. Elements of the partial page update are used to replace corresponding elements of the first page having matching identifiers. In particular, an identifier of an element of the partial page update matches the identifier of the corresponding first page element to be replaced.

In this embodiment of the invention, an origin server may be specifically configured or programmed to serve the partial page update in response to the update request. The origin server may also be configured to serve a full-page update in response to the update request, including the entire set of elements of the second page. Illustratively, the origin server may examine the format of the submitted update request to determine if the first browser page is capable of applying a partial update.

If the first browser page is capable of applying a partial update, the origin server may satisfy the request by returning the requested partial page update. Otherwise, the server may satisfy the request by returning a full-page update in response to the request.

Another embodiment of the invention may further comprise a caching server configured to receive the update request and, in response to the request, deliver the requested partial page update from a cache to the first browser page. The caching server may be further configured to determine and cache, on demand, the requested partial page update.

In this embodiment, the caching server may compare elements of the first browser page against corresponding elements of the second page to determine content and/or structural differences between the first page and the second page, and store the differences. The differences, comprising elements of the second page, and identifiers of the elements, comprise the partial page update. The partial page update may contain one or more elements of the second page that have no corresponding element in the first page.

The contents of the first page and the second page may be retrieved either from a cache or from the origin server.

The caching server may also be configured to examine the submitted update request to determine if the first browser page is capable of applying a partial page update.

If the first browser page is capable of applying a partial update, the caching server may satisfy the request by returning the requested partial page update. Otherwise, the server may satisfy the request by returning a full-page update, wherein the full-page update may comprise the entire set of elements of the second page, in response to the request.

DETAILED DESCRIPTION

Figure 1:
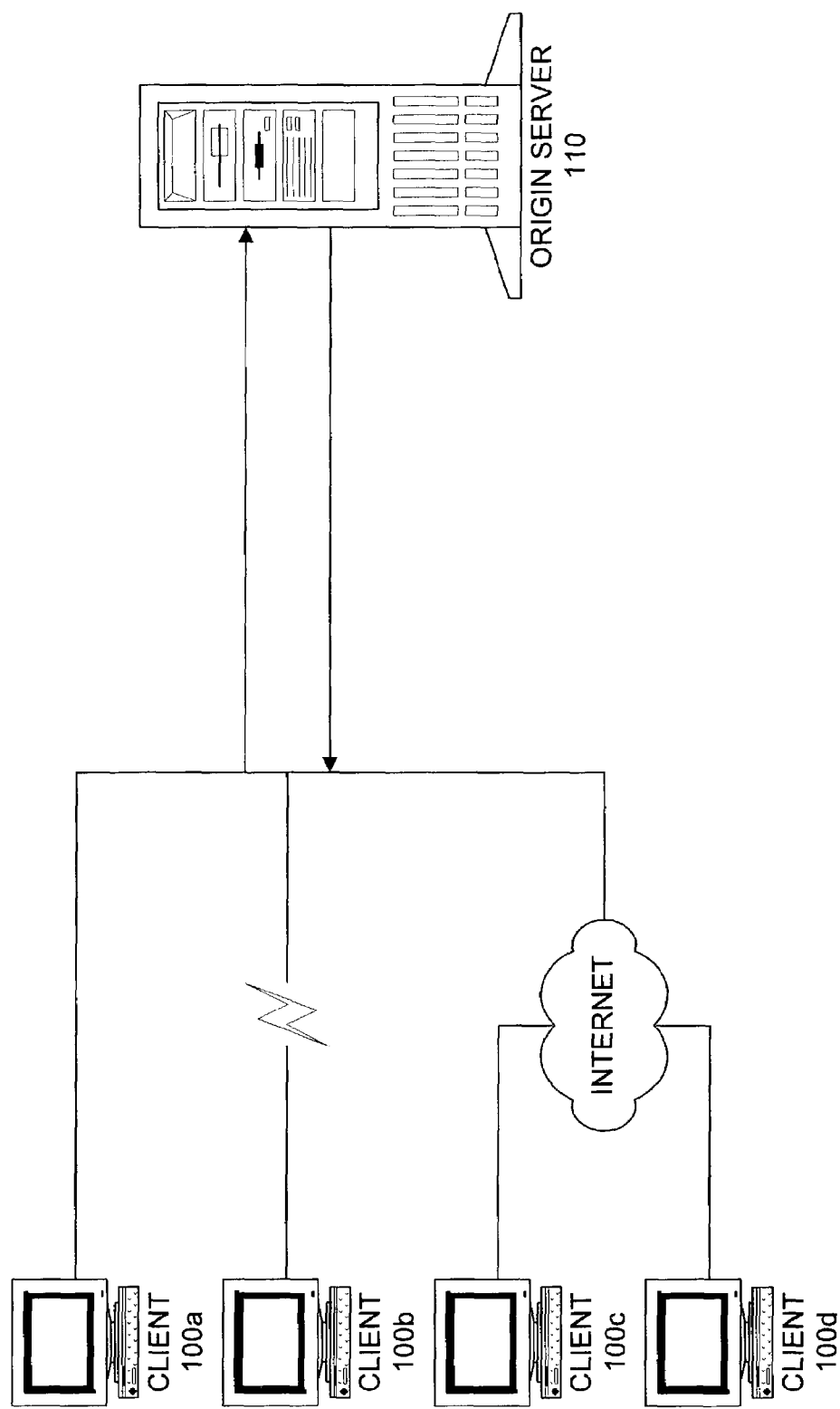
FIG. 1 depicts a system in which a partial page update, received in response to an update request sent to an origin server, may be applied to a client browser page, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, a system and methods are provided for facilitating a partial page update to a first browser page. In this embodiment of the invention, the system may comprise a client configured to execute a browser for displaying a browser page, and an origin server configured to receive an update request and to serve either a partial page update or a full-page update in response to the update request.

The origin server in this embodiment may comprise a web server specifically configured and/or programmed to identify a partial page update request and to deliver the partial page update identified by the update request.

The first browser page includes a hyperlink reference to a second page and one or more elements. Each element is delineated by a Hypertext Markup Language (HTML) tag pair and a content tag identifier.

In this embodiment of the invention, a partial page update includes a change set. Illustratively, a change set includes one or more block-level content elements of the second page that differ from corresponding block-level content elements of the first page, and an associated change set identifier. A non-standard, HTML-style tag pair (e.g., <CHANGES> and </CHANGES>) may delimit the block-level elements of the change set. A standard HTML tag pair and a change tag identifier delineate each element in the change set.

In another embodiment of the invention, a change set may include, in addition to a change set identifier, one or more higher-level HTML elements of the second page, such as a body element or a head element, or one or more lower-level HTML elements of the second page, such as a table data cell. In addition, one or more elements within the change set may be grouped together by a non-standard, HTML-style, tag pair (e.g., <CHANGE_1> AND </CHANGE_1>).

The term 'tag identifier' is used herein to refer to tag identifiers of HTML elements of a first browser page to which a partial page update is applied, and/or elements of a second page into which the first page is being transformed by the update. 'Content tag identifier' may be used to refer specifically to a tag of an element of the first page and/or the second page, while 'change tag identifier' may be used to refer specifically to a tag of an element of a partial page update, and/or a change set.

In addition to a change set, a partial page update may also include a mapping set. Illustratively, a mapping set includes tag identifiers of displayable and non-displayable HTML elements of the second page that are common to the second page and the first page. Each tag identifier of such an element of the second page is matched with a tag identifier of a corresponding common element of the first page. When the mapping set is applied to the first client browser page, the tag identifiers of the common elements of the first page are updated to match the tag identifiers of the second page.

Thus, the partial page update, when applied to the first browser page, updates the first browser page to the second browser page.

In one method of facilitating a partial page update, a first browser page submits an update request to the origin server. The request for the update may be initiated by a hyperlink reference that has been modified to call a script library function. Parameters accompanying the function call reference the second page and a change set identifier. The change set identifier may reference the partial page update.

In this method, the origin server examines the format of the submitted request to determine if the first client browser page is capable of applying a partial update. If the first browser page is capable of applying a partial update, the server may satisfy the request by returning the requested partial page update. Otherwise, if the first browser page cannot apply a partial update, the server may satisfy the request by returning a full-page update in response to the request.

The first browser page then applies the change set, received in the partial page update, to the first page. In applying the change set, each element of the change set replaces a corresponding element of the first page. Corresponding elements are identified by matching change tag identifiers of the change set elements with content tag identifiers of the first page elements.

Additionally, the first browser page may apply the mapping set, also part of the partial page update, to the first page. In applying the mapping set, each content tag identifier of an element of the first page corresponding to an element of the second page is replaced by the content tag identifier of the second page element. As described above, the mapping set may comprise tag identifiers of elements of the first page and tag identifiers of elements of the second page, wherein the elements are common to both pages.

The client browser page may store the partial page update received from the origin server in a buffer area of the first page before applying the update to the first page.

FIG. 1 depicts a system for facilitating a partial page update, in accordance with an embodiment of the present invention. In this embodiment of the invention, the system comprises client 100*a*, client 100*b*, client 100*c*, client 100*d*, and origin server 110. Each client includes a browser configured to display a first browser page that may be capable of submitting a partial page update request to origin server 110.

Illustratively, client 100*a* is directly wired to origin server 110. Client 100*b* communicates with origin server 110 over a wireless link, and clients 100*c* and 100*d* are communicating with origin server 110 via a network, such as the Internet.

Origin server 110 is configured to receive an update request from a first browser page executing in a client, wherein the update request may comprise a reference to a second page and an identifier of a partial page update or a change set reflecting differences between the first page and the second page.

In this embodiment of the invention, if the first browser page submitting the update request does not support a partial page update, the update request may instead comprise a typical browser page request, such as a Uniform Resource Locator (URL) reference to a second browser page.

Origin server 110 is therefore configured to examine the format of the update request to determine if the first browser page submitting the request is capable of applying a partial page update. If the requesting browser page supports a partial page update, origin server 110 returns the partial page update identified in the update request. Otherwise, origin server 110 returns full-page content of the second page identified in the update request.

The partial page update may contain partial content of the second page, to include differences between elements of the first browser page and corresponding elements of the second browser page. The partial update may also include one or more elements of the second browser page that do not correspond to any elements in the first browser page. The partial page update may comprise any level or type of HTML element, displayable or non-displayable, such as a a body element, a head element, a table data cell element, and so on.

The first browser page receives the partial page update and stores it in a buffer within the first browser page. The first client browser page then replaces elements of the first page with corresponding elements of the partial page update, thereby updating the first browser page to the second browser page.

In this embodiment of the invention, origin server 110 may be purposely pre-configured or pre-programmed to support a partial page update of a client browser page within the system depicted in FIG. 1.

Another embodiment of the invention may further comprise, in addition to a client and an origin server, a caching server having a page differential engine configured to generate a partial page update in response to an update request.

The caching server may include a cache for storing both full-page content of a first page and a hierarchical tree representation of HTML elements of the first page, as well as a cache for storing a partial page update that, when applied by the first browser page on the client, transforms the first page into a second page. The cached tree representation of the first page may include, for each element in the tree, a corresponding hash value.

In this embodiment of the invention, the caching server receives a request for a partial page update that may include a reference to the second page and a change set identifier. The change set identifier may be a content tag identifier of an HTML element of the first page. Further, the change set identifier may identify or otherwise reference the partial page update.

If the partial page update, identified by a reference included in the request, is cached, the partial update is served to the first client browser page. Otherwise, the caching server may retrieve the full content of the second page from the origin server and store the page in the full-page cache.

The page differential engine then converts the content of the second page into a tree representation comprising an outline-style hierarchical ordering of HTML elements of the second page. In addition, the engine may add a tag identifier to any element in the tree representation that does not have an associated tag identifier.

Further, the page differential engine may compute a hash value for each element within the tree representation of the second page. In this embodiment of the invention, the hash values may be computed on a level-by-level basis, as the tree is traversed.

By comparing the hash value of each element within the tree representation of the second page against a cached hash value of a corresponding element within a tree representation of the first page, the page differential engine can generate a change set reflecting differences between the two pages. The generated change set may include one or more elements of the second page that have no corresponding elements in the first page.

In this embodiment, the engine may cease comparing hash values after determining an initial level of the tree representation of the second page in which a block-level element hash value of a second page tree element does not match a hash value of a corresponding element in the first page tree representation. The engine may include in the change set each element and/or sub-element comprising the innermost level of the second page tree that completely contains the initial level of block-level HTML elements with non-matching hash values. In this embodiment of the invention, the engine may be configured to include block-level elements (e.g., tables), rather than lower-level elements (e.g., table rows or table data cells) in the change set. In another embodiment of the invention, the engine may be configured to include lower-level HTML elements and/or higher-level HTML elements in the change set.

In this embodiment of the invention, the page differential engine may also generate a mapping set containing pairs of content tag identifiers of elements that are common to the first page and the second page. Each identifier pair may be arranged, or mapped, such that the first identifier in the pair refers to a particular element in the first page, and the second identifier in the pair refers to the corresponding element in the second page.

The page differential engine may cache the change set and the mapping set.

Figure 2:
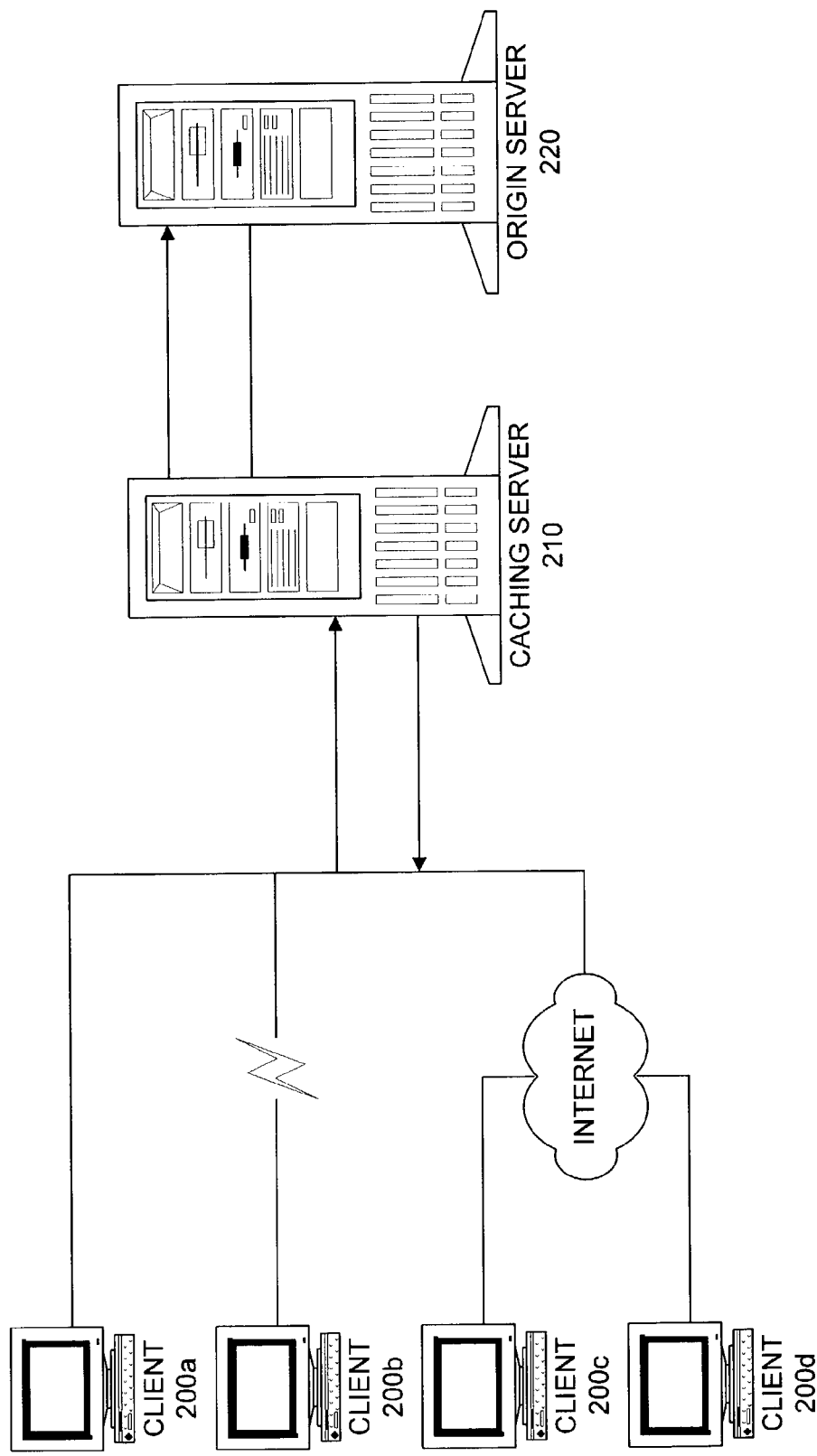
FIG. 2 depicts a system in which a partial page update, received in response to an update request sent to a caching server configured to generate the partial page update, may be applied to a client browser page, in accordance with an embodiment of the invention.

FIG. 2 depicts another system for facilitating a partial page update, in accordance with another embodiment of the invention. In this embodiment of the invention, the system comprises clients 200a, 200b, 200c, and 200d, caching server 210 and origin server 220, wherein the clients and the origin server may be configured similarly and/or may operate similarly to corresponding system components of the embodiment of the invention depicted in FIG. 1.

In the embodiment of FIG. 2, caching server 210 is configured to receive from a client an update request identifying a second page and a partial page update. Caching server 210 is further configured to deliver the identified partial page update, from a cache, to a first browser page that requested the partial update.

The partial page update, when applied to the first browser page, transforms the first browser page into the second browser page by replacing each content element of the first page that differs from a corresponding content element of the second page, with the content element of the second page. The partial page update may also include one or more elements of the second page that have no corresponding element in the first page.

In this embodiment of the invention, caching server 210 may be further configured to determine and cache the requested partial page update. As described above, to facilitate determination of a partial page update, caching server 210 may compare a hash computed on each HTML element of the first browser page against a corresponding HTML element hash of the second page to identify content differences (i.e., elements of the second page that differ from the first page).

Caching server 210 may store the differences in a cache. In this embodiment of the invention, the content of the first browser page and/or the content of the second browser page may be retrieved either from a cache or from the origin server.

Caching server 210 may also be configured to examine the submitted update request to determine if the first browser page requesting the update is capable of applying a partial page update. If the first browser page is capable of applying a partial update, the caching server satisfies the request by returning the requested partial page update. Otherwise, the server satisfies the request by returning a full-page update, comprising the full content of the second page, in response to the request.

Figure 3:
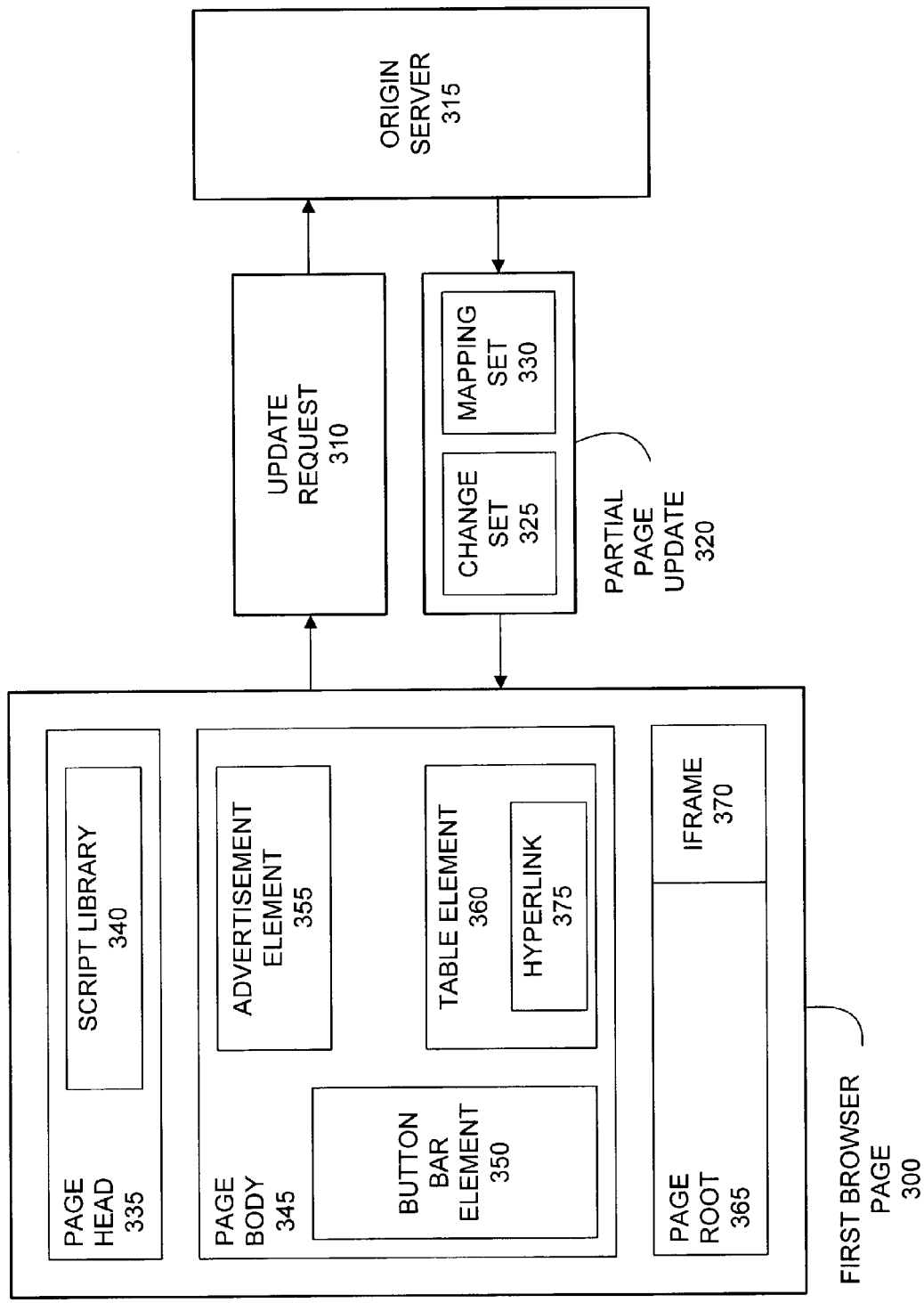
FIG. 3 is a block diagram illustrating a first browser page configured to apply a partial page update received in response to a partial page update request, in accordance with an embodiment of the invention.

FIG. 3 is a block diagram illustrating a first browser page configured to apply a partial page update received in response to a partial page update request, in accordance with an embodiment of the invention.

In this embodiment of the invention, first browser page 300 is displayed on a client device, such as a personal computer. In an alternative embodiment of the invention, the client device may be a workstation, a mobile computing device, or some other device capable of displaying a browser page.

First browser page 300 submits update request 310, comprising a request for a partial page update, to origin server 315. Origin server 315 returns partial page update 320 to first browser page 300 in response to request 310. Browser page 300 then applies partial update 320, thereby updating first browser page 300 to a second browser page.

In this embodiment of the invention, first browser page 300 comprises page head 335, page body 345, and page root 365. The various components of the first browser page shown in FIG. 3 are illustrative, and do not limit embodiments of the invention to any particular page form or format.

Page head 335 includes script library 340 which may be a JavaScript™ function library. In one alternative embodiment of the invention, script library 340 may comprise a function library developed with or supplied by another scripting tool, such as Visual Basic Scripting Edition (VBScript). In the illustrated embodiment of the invention, origin server 315 may place script library 340 in page head 335 before serving the first browser page.

Page body 345 includes button bar element 350, advertisement element 355 and table element 360. In this embodiment of the invention, each element of page body 345 comprises one or more browser-displayable block-level elements. In another embodiment of the invention, page body 345 may include non-displayable elements, such as an audio stream, or other types of elements. Origin server 315 associates a content tag identifier with all elements of first browser page 300, or a subset of all the elements, before serving page 300 to the client. Illustratively, each content tag identifier comprises an HTML tag identifier.

In FIG. 3, button bar element 350 and advertisement element 355 comprise block-level HTML elements common to first browser page 300 and the second browser page. Stated alternatively, button bar element 350 and advertisement 355 comprise HTML elements that, when displayed in either first browser page 300 or the second browser page, have substantially identical content, size, shape, color, position, and/or other characteristics, in either browser page.

Table element 360 comprises a block-level HTML table, the content of which (in one or more data cells or rows of the table), differs from a corresponding table in the second browser page. Each data cell of table 360 may contain one or more nested table elements. Table element 360 also includes hyperlink 375. Illustratively, hyperlink 375 comprises an HTML anchor tag reference between first browser page 300 and the second page, formatted as a Uniform Resource Locator (URL).

Page root 365 comprises iframe 370, a non-displayable inline frame element configured to receive and buffer partial page update 320.

In this embodiment of the invention, update request 310 references or otherwise identifies the second page and either or both of partial page update 320 and a change set reflecting differences between the first and second browser pages. In another embodiment of the invention, update request 310 may include a Uniform Resource Locator (URL) reference to the second page.

In the illustrated embodiment of the invention, origin server 315 is specifically configured or programmed to serve partial page update 320 in response to update request 310.

In another embodiment of the invention, origin server 315 may be configured to serve a typical full-page update, instead of just a partial update, in response to update request 310. Thus, origin server 315 may also store the full-page content of the second browser page.

In the embodiment of the invention depicted in FIG. 3, partial page update 320 includes change set 325 and mapping set 330.

Illustratively, change set 325 includes one or more block-level HTML elements of the second page that differ from corresponding elements of the first page, and a change set identifier. In addition, each block-level element within change set 325 is associated with a change tag identifier. The change set identifier and change tag identifiers may be assigned by the origin server. Change set 325 also includes an HTML body tag comprising one or more calls to functions in script library 340. In another embodiment of the invention, each element within change set 325 may include, in addition to a change tag identifier and a body tag, one or more higher-level and/or lower-level HTML elements, such as a complete body element, or a table data cell element, or other types of elements of the second page.

Thus, in the illustrated embodiment of the invention, change set 325 includes a table element of the second browser page that corresponds to, but differs from, table element 360 of first browser page 300. The change set also includes a change tag identifier associated with the table element of the second browser page, a change set identifier for identifying change set 325, and an HTML body tag comprising an 'on load' function call to a function of script library 340.

Mapping set 330 contains pairs of content tag identifiers of HTML elements common to the first page and the second page. Each identifier pair may be arranged, or mapped, such that the first identifier in the pair refers to an element of the first page, and the second identifier in the pair refers to the corresponding HTML element of the second page, or vice versa.

Thus, in the illustrated embodiment of the invention, a first mapped identifier pair includes the content tag identifier of button bar 350 and the content tag identifier of a corresponding button bar element in the second browser page. A second mapped identifier pair includes the content tag identifier of advertisement 355 and the content tag identifier of a corresponding advertisement element in the second browser page. In this embodiment of the invention, mapping set 330 also contains additional mapped identifier pairs associated with the other HTML elements common to the first page and the second page, which may include, but is not limited to, tag identifiers of the page head elements of each page.

In this embodiment of the invention, first browser page 300 is retrieved from origin server 315, and an 'on load' event of script library 340, triggered by the loading of first browser page 300, signals load completion of the first browser page. In response to the load completion signal, first browser page 300 modifies hyperlink 375 to include a parameterized call to an 'on click' function of script library 340. A first function parameter references the second browser page and a second function parameter references the change set identifier of change set 325. In this embodiment of the invention, the first and second parameters can be used to reference or identify partial page update 320. The 'on click' function of script library 340, when initiated, may set the anchor source of hyperlink 375 to be iframe 370.

First browser page 300 determines the second function parameter by parsing, from hyperlink 375 outward, the hierarchical HTML code comprising the HTML elements of first browser page 300, and identifying the content tag identifier of table element 360. This content tag identifier is used as the second parameter.

Upon selection of modified hyperlink 375 (e.g., by a user), update request 310, including the two function parameters, is transmitted to origin server 315. Similar to a typical, non-parameterized hyperlink-initiated request, update request 310 may also implicitly include a reference to first browser page 300 (i.e., the link source page).

The origin server may use the first function parameter (i.e., a reference to the second browser page), and/or the second function parameter (i.e., the content tag identifier of table element 360) to identify partial page update 320.

In this embodiment of the invention, origin server 315 is configured to maintain, with respect to first browser page 300 and the second browser page, a one-to-one relationship between the content tag identifier of table element 360 and the corresponding change tag identifier of the table element of change set 325. In response to update request 310, origin server 315 identifies partial page update 320, and serves the update, including change set 325 and mapping set 330, to first browser page 300.

First browser page 300 applies partial page update 320 by identifying the HTML element comprising table element 360, and replacing the identified HTML element with the corresponding HTML element of the second page from change set 325. In this embodiment of the invention, the content tag identifier of table element 360 matches the change tag identifier of the corresponding table element from change set 325.

In applying the partial page update, first browser page 300 also replaces the content tag identifier of button bar element 350 with the second content tag identifier of the first mapped pair of content tag identifiers (from mapping set 330). As described above, the second content tag identifier of the first mapped pair of tag identifiers corresponds to the button bar element in the second browser page.

Likewise, first browser page 300 replaces the content tag identifier of advertisement element 355 with the second content tag identifier of the second mapped pair of content identifier pairs in mapping set 330.

First browser page 300 completes the partial page update, to transform first browser page 300 into the second browser page, by modifying newly updated hyperlink 375 to include a parameterized call to an 'on click' function of script library 340. The hyperlink modification process may be initiated by an 'on load' event or function call included in change set 325. As described above, a first parameter of the function call references the browser page referenced in newly updated hyperlink 375 and a second function parameter references the change set identifier of the change set corresponding to the block-level element of the page referenced in the newly updated hyperlink 375.

Figure 4:
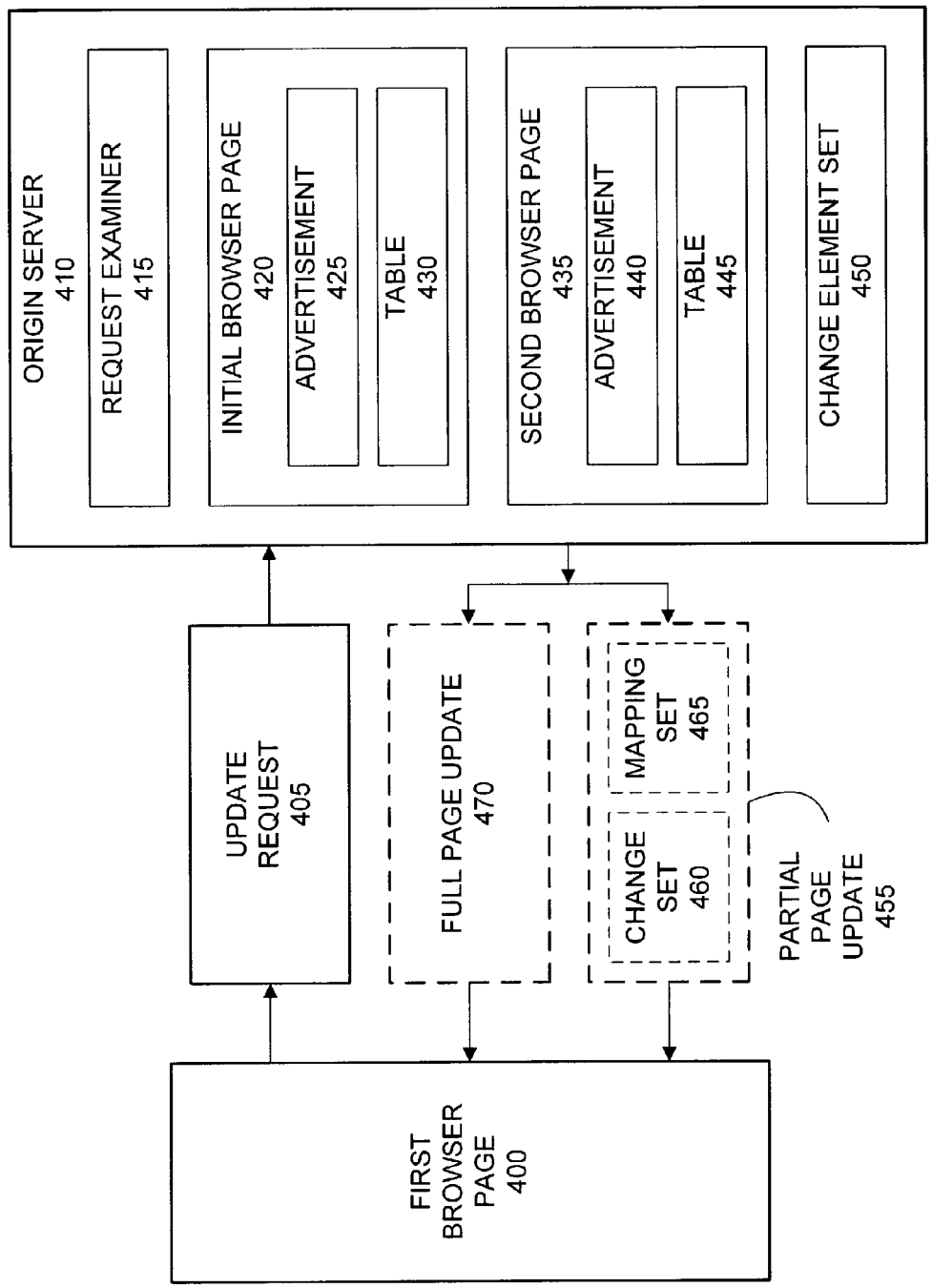
FIG. 4 is a block diagram illustrating an origin server, in accordance with an embodiment of the invention.

FIG. 4 is a block diagram illustrating an origin server for facilitating a browser page update, in accordance with an embodiment of the invention. In FIG. 4, origin server 410 generates either partial page update 455 or full page update 470 in response to update request 405.

In this embodiment of the invention, first browser page 400, update request 405, partial page update 455, change set 460 and mapping set 465 may be configured similarly and/or may operate similarly to corresponding components of the embodiment of the invention depicted in FIG. 3.

In the illustrated embodiment, origin server 410 includes request examiner 415, initial browser page 420, second browser page 435, and change element set 450.

Illustratively, first browser page 400 includes some or all of the content of initial browser page 420, but has been modified as described above (e.g., to contain a script library, to convert a hyperlink into a function call).

Initial browser page 420 corresponds to a state of first browser page 400 before modification of the HTML head of browser page 400, by origin server 410, to include a script function library, such as a JavaScript™ function library. Second browser page 435 reflects the end result of applying partial page update 455 to first browser page 400.

Initial browser page 420 includes advertisement 425 and table 430. Second browser page 435 includes advertisement 440 and table 445. Although omitted from FIG. 4 for the sake of clarity, initial page 420 and/or second page 435 may each include one or more additional displayable or non-displayable HTML elements (e.g., tables, paragraphs, page heads).

Each HTML element of initial browser page 420, including advertisement 425 and table 430, is assigned a content tag identifier by origin server 410. Similarly, origin server 410 assigns a content tag identifier to each HTML element of second browser page 435, including advertisement 440 and table 445.

Content tag identifiers assigned to elements of page 420 may be unique. Likewise, content tag identifiers assigned to elements within page 435 may also be unique. Illustratively, the assignment of content tag identifiers by origin server 410 occurs prior to construction of first browser page 400.

In the embodiment of FIG. 4, advertisement 425, and advertisement 440 are block-level HTML elements common to initial browser page 420 and second browser page 435. Stated alternatively, advertisement 435, when displayed in browser page 420 has substantially identical content, size, shape, color, position, and/or other characteristics as advertisement 440, when advertisement 440 is displayed in browser page 435.

Table 430 comprises a block-level HTML table element whose content, in one or more data cells or rows, differs from the content of corresponding table 445 of page 435.

In the embodiment of the invention depicted in FIG. 4, change element set 450 contains a single HTML element, table 445. In another embodiment of the invention, change element set 450 may contain additional displayable and/or non-displayable HTML elements of second browser page 435 that have no corresponding elements in initial page 420.

Each element of change element set 450 is associated with a change tag identifier. In this embodiment of the invention, origin server 410 may maintain a matching, one-to-one correspondence between change tag identifiers and content tag identifiers of each of the elements of change element set 450 and their corresponding elements in first browser page 400. Since first browser page 400 is derived from initial browser page 420, the content tag identifier of table 445 and the content tag identifier of the corresponding table in first browser page 400 may also match.

In origin server 410, request examiner 415 receives update request 405. In this embodiment of the invention, update request 405 may be a partial page update request that identifies or otherwise references second browser page 435 and change element set 450, or update request 405 may be a typical Uniform Resource Locator (URL) reference to second browser page 435. Request examiner 415 therefore examines update request 405 to determine if update request 405 is a partial page update request, or a URL page request.

If update request 405 is a partial page update request, request examiner 415 instructs origin server 410 to assemble and/or generate partial page update 455.

In the embodiment illustrated in FIG. 4, change set 460 includes the contents of change element set 450. Origin server 410 uses references, received in update request 405, to identify or generate change element set 450. The origin server may retrieve change element set 450 from a stored, pre-determined set of replacement elements, or it may generate change element set 450 on-demand, in response to update request 405.

Mapping set 465 contains pairs of content tag identifiers of HTML elements common to initial browser page 420 and second browser page 435. Each identifier pair may be arranged, or mapped, such that one identifier in the pair refers to an element of initial browser page 420 (and to an element of first browser page 400, since page 400 is derived from page 420), and the other identifier in the pair refers to the corresponding HTML element of second browser page 435. In the illustrated embodiment of the invention, mapping set 465 contains the content tag identifiers of advertisement 425 and advertisement 440. Mapping set 465 may also contain content tag identifiers of other HTML elements common to initial page 420 and second page 435, such as head and/or body elements.

If update request 405 is a typical URL request, request examiner 415 instructs origin server 410 to deliver full page update 470 to first browser page 400. In the illustrated embodiment of the invention, full page update 470 comprises second browser page 435.

Figure 5:
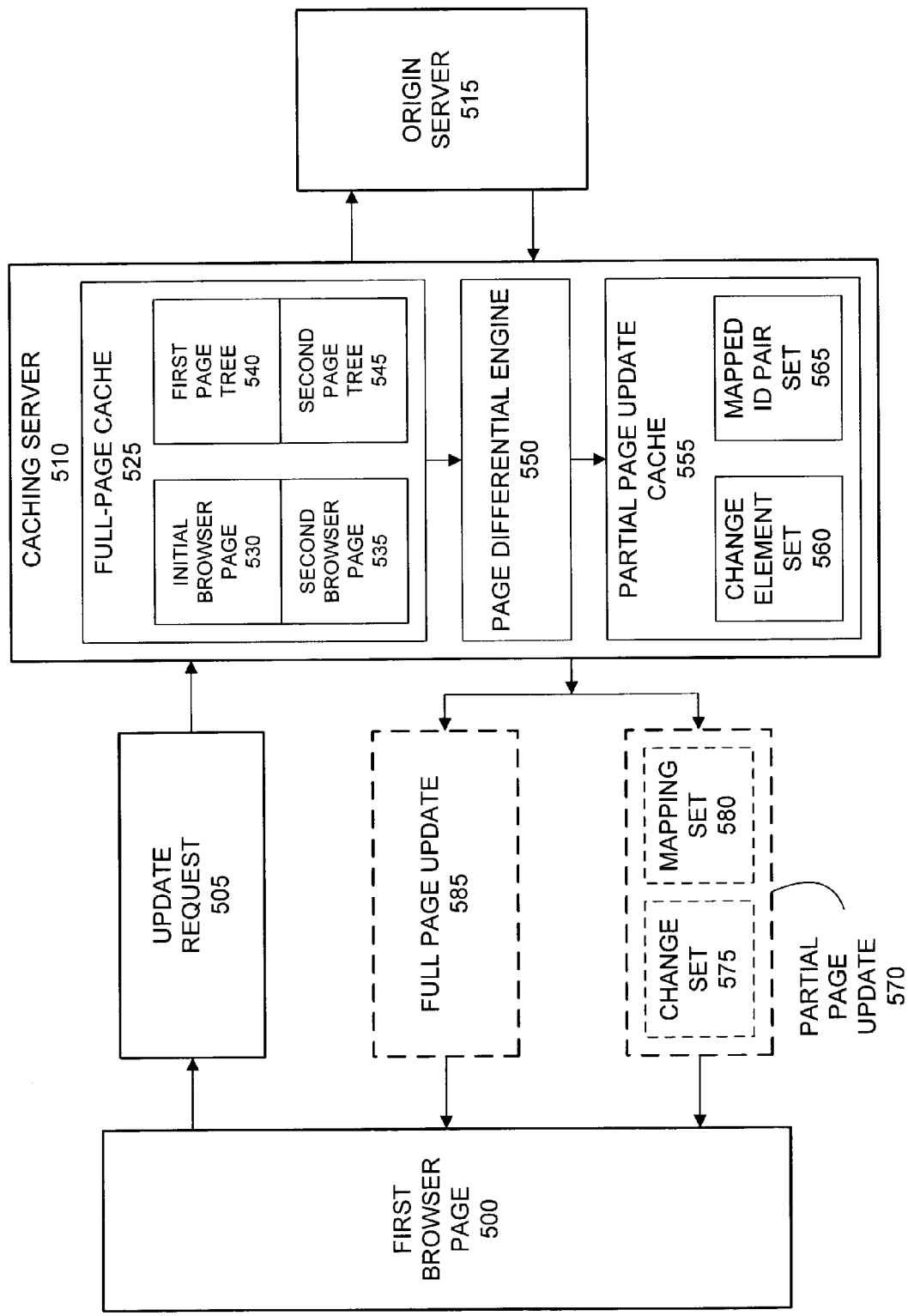
FIG. 5 is a block diagram illustrating a caching server, in accordance with an embodiment of the invention.

FIG. 5 is a block diagram illustrating a caching server for facilitating an update to a browser page, in accordance with an embodiment of the invention. In FIG. 5, caching server 510 is configured to generate, based upon the format and/or content of update request 505, either partial page update 570 or full page update 585, in response to the update request.

In this embodiment of the invention, first browser page 500, update request 505, partial page update 570, change set 575 and mapping set 580 may be configured similarly and/or may operate similarly to corresponding components of the embodiment of the invention depicted in FIG. 3. Origin server 515 may be configured similarly and/or may operate similarly to origin server 410 of FIG. 4.

Caching server 510 comprises full-page cache 525, page differential engine 550, and partial page update cache 555. Full-page cache 525 includes initial browser page 530, second browser page 535, first page tree 540, and second page tree 545.

Illustratively, first browser page 500 comprises some or all of the content of initial browser page 530, but has been modified as described above (e.g., to convert a hyperlink into a function call). Initial browser page 530 corresponds to the state of first browser page 500 before modification of the HTML head of browser page 500, by caching server 510, to comprise a script function library. Further, initial browser page 530 may represent a cached copy of an initial browser page from origin server 515.

Second browser page 535 may represent a cached copy of a second browser page from origin server 515. Further, application of partial page update 570 to first browser page 500 will transform first browser page 500 into second browser page 535.

First page tree 540 is a cached, hierarchically ordered, tree representation of HTML elements within initial browser page 530. Second page tree 545 is a cached, hierarchically ordered, tree representation of HTML elements within second browser page 535. In this embodiment of the invention, each element of first page tree 540 may have an associated tag identifier, and each tag identifier may match or reference a corresponding content tag identifier of first browser page 500.

Partial page update cache 555 comprises change element set 560 and mapped id pair set 565. As described above, change element set 560 may comprise one or more elements of second browser page 535 that differ from first browser page 500. Each element is identified by a change tag identifier. And, mapped id pair set 565 comprises one or more sets of identifiers of HTML elements common to the first and second page. Partial page update cache 555 may associate or link mapped id pair set 565 to change element set 560. In this embodiment of the invention, a non-standard, HTML-style tag pair (e.g., <CHANGES> and </CHANGES>) may delimit the set of elements comprising element set 560.

In caching server 510, update request 505 is received and examined. In this embodiment of the invention, update request 505 may be a partial page update request that identifies second browser page 535 and change element set 560, or update request 505 may be a typical Uniform Resource Locator (URL) reference to second browser page 535.

If update request 505 is a typical Uniform Resource Locator (URL) reference to second browser page 535, caching server 510 returns full page update 585 in response to update request 505. In this embodiment of the invention, full page update 585 comprises the full page HTML content of second browser page 535.

If update request 505 is a partial page update request, caching server 510, using identifiers received as part of update request 505, searches partial page update cache 555 for the identified change element set (i.e., change element set 560), and any associated mapped id pair set (i.e., mapped id pair set 565).

If the change element set 560 exists in partial page update cache 555, page differential engine 550 assembles partial page update 570 to include change set 575 and mapping set 580.

If change element set 560 is not present in partial page update cache 555, page differential engine 550 generates second page tree 545 from the page content of second browser page 535, and stores second page tree 545 in full-page cache 525. In this embodiment of the invention, page differential engine 550 may add a tag identifier to each HTML element in second page tree 545 that does not already have an associated identifier.

Starting from the top of the outermost level of the HTML tree elements of second page tree 545, page differential engine 550 computes, while traversing the tree level-by-level, a hash value for each HTML element within the current level. After computing the element hash values, page differential engine 550 compares each computed current level HTML element hash of second page tree 545 against a previously computed and stored hash value of a corresponding HTML element of a corresponding level of cached first page tree 540.

In the embodiment illustrated in FIG. 5, page differential engine 550 may continue traversing second page tree 545 inward, comparing HTML element hashes on a level-by-level basis, until identifying an innermost level of second page tree 545 in which one or more hashes of second page tree 545 do not match a hash value of a corresponding element of first page tree 540.

While comparing corresponding HTML elements of first page tree 540 and second page tree 545, page differential engine 550 may generate mapped id pair set 565 by identifying one or more pairs of corresponding tree element tag identifiers. Each identifier pair may comprise an element tag identifier of first page 540 and a corresponding element tag identifier of second page tree 545, whose element hash values match.

Page differential engine 550 may then assemble change element set 560 from each element and/or sub-element comprising a tree level of second page tree 545 that is one or more levels outward from the identified innermost level of second page tree 545 containing elements with non-matching hash values. In addition, page differential engine 550 may include in change element set 560 one or more elements of second page tree 545 that have no corresponding elements in first page tree 540.

In this embodiment of the invention, page differential engine 550 may be configured to include block-level elements (e.g., tables), rather than lower-level elements (e.g., table rows or table data cells) in change element set 560. In another embodiment of the invention, the engine may be configured to include lower-level HTML elements and/or higher-level HTML elements, of one or more tree levels, in change element set 560.

In this embodiment of the invention, page differential engine 550 may modify one or more change tag identifiers of elements comprising change element set 560 to insure a match between each change tag identifier of change element set 560 and a corresponding content tag identifier of first browser page 500.

Further, page differential engine 550 may insert an <HTML> tag, denoting the beginning of change set 575, and a matching </HTML> tag, denoting the end of change set 575, to change set 575. And, within the <HTML> and </HTML> tag pair, page differential engine may add a 'body' tag pair, comprising a script function call (e.g., <BODY onLoad="doUpdate( )"> and </BODY>), delimiting change element set 560. When received by first browser page 500, the function call may initiate the updating of first browser page 500 with partial page update 570.

After caching change element set 560 and mapped id pair set 565 in partial update cache 555, page differential engine 550 then returns partial page update 570, comprising change element set 560 and mapped id pair 565, in response to update request 505.

In the illustrated embodiment of FIG. 5, page differential engine 550 includes logic for determining and/or generating partial page update 570. In another embodiment of the invention, page differential engine 550 may be implemented on another server (e.g., an application server), on a client, or some other device.

Figure 6:
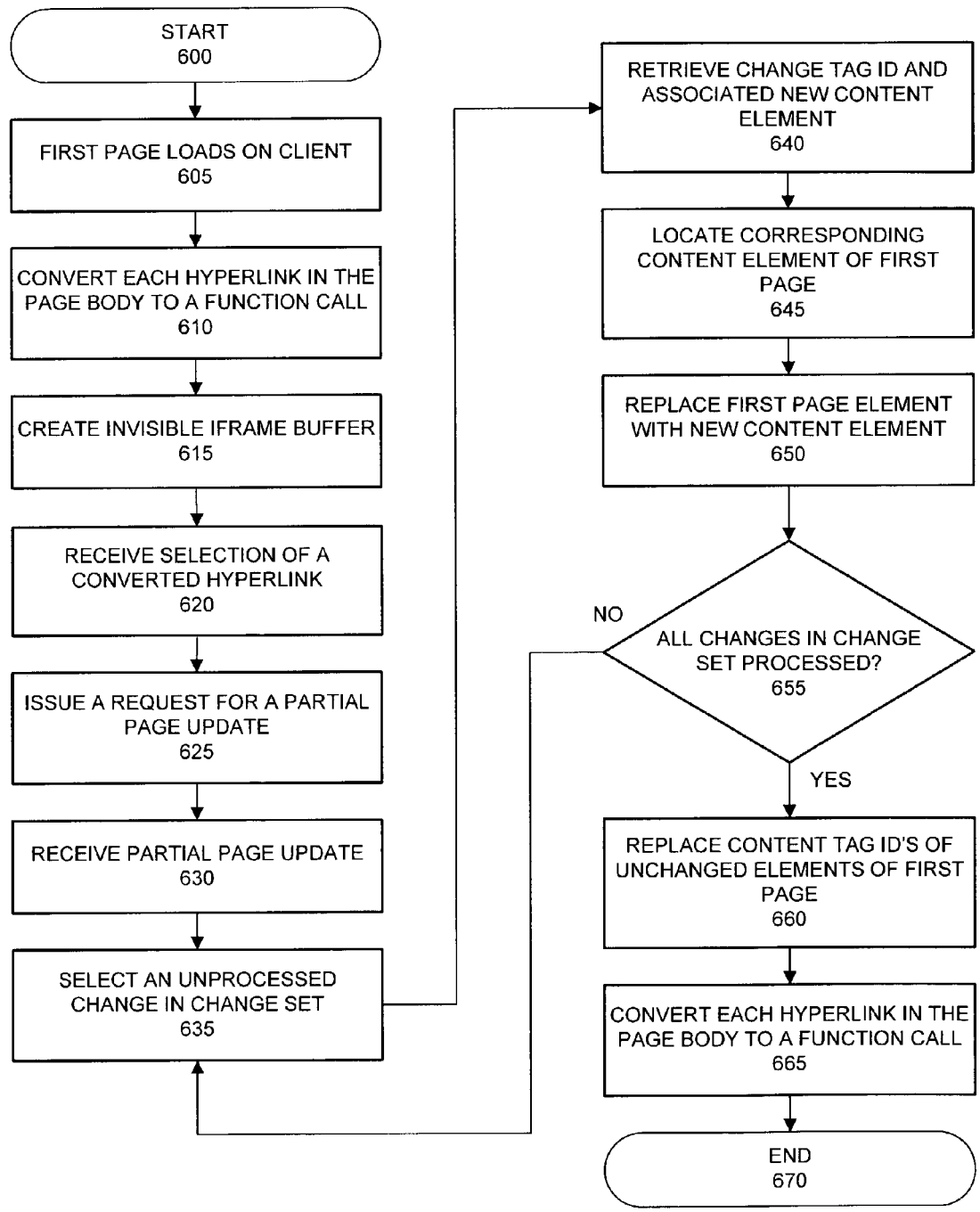
FIG. 6 is a flowchart illustrating one method of applying a partial page update to a client browser page, in accordance with an embodiment of the invention.

FIG. 6 is a flowchart illustrating one method of applying a partial page update to a browser page of a client computing device, in accordance with an embodiment of the invention.

State 600 is a start state. In state 605, a client browser, configured to request and apply a partial page update as part of a system for facilitating a partial page update to a client browser page, receives a first browser page. An HTML head element of the received first page comprises a script function library, and the body element comprises an 'on load' script library function call (e.g., <BODY onLoad="doInitialize( )">) to an initialization routine configured to execute after the first browser page is completely loaded on the client browser. Some or all HTML elements of the first page may be associated with content tag identifiers.

In the embodiment of the invention depicted in FIG. 6, the client browser is a Netscape browser configured to accept and display pages formatted according Hypertext Markup Language (HTML). The browser is also configured to accept and execute one or more functions or methods developed or supplied with JavaScript™. As one skilled in the art will recognize, the browser may be another type, such as Internet Explorer, and the scripting language may also be another type, such as Visual Basic Scripting Edition (VBScript).

In state 610, the first browser page, executes the initialization routine described above and modifies each hyperlink in the page body to comprise a parameterized call to an 'on click' function of the JavaScript™ library. The specified function, when selected, will generate a partial page update request. In this embodiment of the invention, the request may be submitted to either an origin server, such as a web server, or to a caching server.

A first parameter of the function call identifies or references the browser page referenced by the Uniform Resource Locator (URL) of the hyperlink prior to its modification. A second parameter identifies or references a partial page update that, when applied to the first page, will update the first page to the page referenced by the hyperlink. In this embodiment of the invention, the second parameter may comprise a content tag identifier of a block-level element containing the modified hyperlink.

In state 615, the first page creates an iframe buffer, a non-displayable HTML inline frame for receiving the partial page update, in the page root of the first page.

In state 620, a selection of a first modified hyperlink is received (e.g., from a user of the client device). The first parameter of the function call of the hyperlink identifies a second page associated with the hyperlink, and the second parameter references or identifies a partial page update. In this embodiment of the invention, selection of the modified hyperlink directs the anchor source of the hyperlink to reference or 'point' to the iframe buffer created in state 615.

In state 625, an update request is issued for a partial page update that, when applied to or by the first page, will transform or update the first page to the second page.

In state 630, the iframe buffer receives the requested partial page update. In the illustrated method, the partial page update includes a change set containing one or more block-level HTML elements of the second browser page that differ from corresponding elements of the first page (i.e., block-level changes), and change tag identifiers of the second page HTML elements. The change set may also include one or more elements of the second page that have no corresponding elements in the first page.

Illustratively, the change set may further comprise a body 'on load' script library function call (e.g., <BODY onLoad="doUpdate( )">) to an update routine configured to execute after the partial page update is completely received by the iframe buffer. The partial page update may also include a mapping set of content tag identifiers from the first page and second page, of HTML elements common to both pages.

In state 635, the first browser page, executing the update routine of state 630, selects an unprocessed change (e.g., an HTML element) of the change set.

In state 640, the selected HTML element and accompanying change tag identifier are retrieved from the change set.

In state 645, the HTML element of the first page that has a content tag identifier matching, or referenced by, the change tag identifier of the new HTML element of the change set is located.

In state 650, the located HTML element of the first page is replaced with the new HTML element (i.e., a second page element), from the change set.

In state 655, the update routine of state 630, executing in the first browser page, determines whether all changes in the change set have been applied. If so, the illustrated method advances to state 660. Otherwise, the method returns to state 635 to apply the next change.

In state 660, the update routine applies the mapping set to update the content tag identifiers of elements of the first page, that are common to the second page, with the content tag identifiers of those elements in the second page.

In state 665, as a final step in transforming the first page into the second page, each hyperlink in the body of the transformed page is converted into a function call, as described above in state 610, with appropriate parameters. State 665 is an end state.

Figure 7:
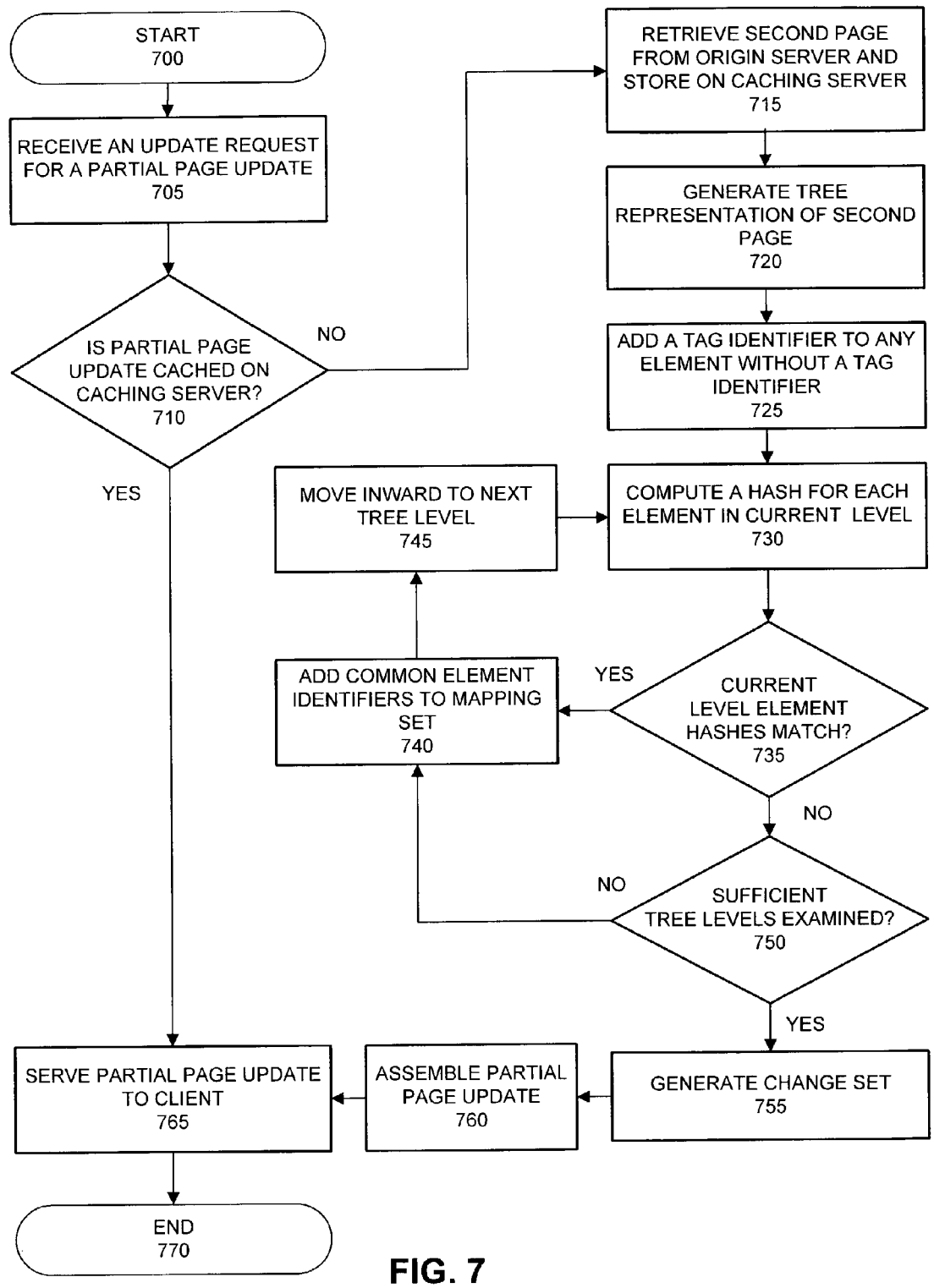
FIG. 7 is a flowchart illustrating one method of generating and caching a partial page update, in accordance with an embodiment of the invention.

FIG. 7 is a flowchart illustrating one method of generating and caching a partial page update, in accordance with an embodiment of the invention.

State 700 is a start state. In state 705, a caching server, configured to generate a partial page update as part of a system for facilitating a partial page update of a first client browser page to a second client browser page, receives a request from a first browser page for a partial page update. The request may include identifiers or references to a second browser page and the partial page update. In this embodiment of the invention, the system may include an origin server (e.g., a web server) configured to receive a typical Uniform Resource Locator (URL) page request for the first page and/or the second page, and to deliver, in response to the URL request, the first and/or second page.

The caching server may include one or more caches storing the full-page content of the first page and a first page tree. The first page tree may comprise a hierarchically ordered tree representation of the HTML elements of the first page. Each HTML element of the first page tree may include a tag identifier and an associated hash value. The caching server may also comprise a cache for storing one or more partial page updates.

In state 710, the caching server determines if the partial page update, referenced in the received request, is cached. If the requested partial page update is not cached, the caching server continues at state 715. If the requested update is cached, the illustrated method advances to state 765.

In state 715, the caching server retrieves and caches the second browser page, referenced in the received request, from an origin server.

In state 720, the caching server converts the second page into a second page tree, which may be cached. The second page tree, similar to the first page tree, may comprise a hierarchically ordered tree representation of the HTML elements of the second page.

In the embodiment of the invention illustrated in FIG. 7, the elements of the first page and the second page are each ordered, in the first page tree and the second page tree, as a hierarchical tree structure. In another embodiment of the invention, the elements of the first and/or second pages may be ordered in another manner, such as a heap or other structure.

In state 725, the caching server may add a tag identifier to any HTML element in the second page tree that does not have a tag identifier. Illustratively, an origin server may have associated tag identifiers with one or more of the elements of the second page. Further, the caching server may add a tag identifier to any sub-element of an HTML element (e.g., a table row of a table and/or a table data cell of a table row) that does not have a tag identifier.

In another embodiment of the invention, the caching server may be configured to add a tag identifier only to block-level elements (e.g., tables) rather than sub-elements (e.g., table rows and/or table data cells) of block-level elements. The tag identifier of a higher-level element (e.g., a table) identifies any sub-element (e.g., table row) of the higher-level element not given its own tag identifier.

In state 730, the caching server computes a hash value for each HTML element within the current level of the second page tree.

In this embodiment of the invention, the caching server traverses the second page tree and computes element hashes from the outermost level of HTML elements to the innermost level of elements, one level at a time. Thus, the first level of the second page tree may comprise an <HTML> element, the second level may comprise a <BODY> element, the third level may comprise one or more <TABLE> elements, the fourth level may comprise one or more tables nested within a third level table, and so on.

In another embodiment of the invention, the caching server may be configured to compute element hashes that span two or more levels of HTML elements. Illustratively, a single hash value may be computed for each block-level element, wherein each hash includes a block-level element as well as each sub-element of the block level element that does not have an associated tag identifier. The caching server may compute a separate hash for each sub-element of the block-level element that has its own tag identifier.

In state 735, the caching server compares each computed current-level HTML element hash of the second page tree against an HTML element hash value of the corresponding level of the first page tree to determine whether the corresponding element hashes match. In another embodiment of the invention, the caching server may compare element hashes of the second page tree against element hashes of the first page tree that correspond, but span multiple levels of the respective trees. If the corresponding element hashes match, the illustrated method advances to state 740, otherwise the method proceeds to state 750.

In state 740, for each element hash of the second page tree that matches an element hash of the first page tree (i.e., for an element common to both page trees), the caching server may add a pair of mapped tag identifiers to a mapping set. In this embodiment of the invention, the first tag identifier of each pair is the tag identifier of the element from the first page tree, and the second tag identifier is the tag identifier of the element from the second page tree.

In state 745, the caching server changes the focus of its comparison, and moves a level inward in the second page tree. After moving inward a level, the caching server returns to state 730 to compute the element hashes for the new level of the second page tree.

In state 750, the caching server determines if a sufficient number of levels of the second page tree has been traversed and compared against the first page tree. In this embodiment of the invention, the caching server may be configured to cease traversing the second page tree after reaching a level of the second page tree in which one or more block-level element hash values of a second page tree element do not match hash values of corresponding elements in the first page tree.

Alternatively, the caching server may cease traversing levels of the second page tree after identifying a level of the tree in which one or more elements of the second page tree have no corresponding elements in the first page tree. In another embodiment of the invention, the caching server may be configured to compare HTML element hashes of the first and second page trees to virtually any level, whether low (e.g., table rows, table data cells or nested tables) or high.

If the caching server determines that the second page tree has been traversed inward an insufficient number of levels, the caching server returns to state 740, if necessary, to add one or more pairs of element tag identifiers of the first and second page tree that are common to both trees, and to continue traversing the second page tree inward. Otherwise, the caching server advances to state 755.

In state 755, the caching server generates the change set. In this embodiment of the invention, the change set includes each element and/or sub-element of the level of the second page tree that contains one or more block-level HTML elements whose hash values do not match hash values of corresponding elements in the first page tree. The change set may instead, or in addition, include elements of the second page tree that have no corresponding element in the first page tree.

The caching server may place the selected elements from the second page tree between a matching pair of <HTML> and </HTML> tags. Further, the caching server may add a 'body' tag to the change set, between the <HTML> tag and the second page tree elements. The added tag may comprise an 'on load' script library function call (e.g., <BODY onLoad="doUpdate( )">) to an update routine of the first client browser page.

In state 760, the caching server assembles the change set and the mapping set, to be the partial page update. After assembling the partial page update, the caching server may cache the update.

In state 765, the caching server serves the partial page update to the first browser page, in response to the update request. After serving the update, the illustrated method advances to state 770, an end state.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of applying an incremental update to an electronic page, the method comprising:
   receiving a first electronic page comprising:
      a first set of content elements, wherein each element in the first set of content elements comprises a browser-displayable content block and a unique content block identifier;
      a set of links, wherein each link in the set of links comprises a reference to another electronic page; and
      a computer-executable function;
   modifying each link in the set of links to include:
      a call to the function; and
      a set of parameters configured to identify an incremental update to the first electronic page;
   receiving a selection of a first link in the set of links, wherein the first link references a second electronic page and identifies a first incremental update to the first electronic page;
   initiating a request for the first incremental update;
   receiving a second set of content elements in response to the request for the first incremental update, wherein each element in the second set of content elements comprises a browser-displayable content block of the second electronic page and a unique change content block identifier; and
   replacing one or more of the elements of the first set of content elements with corresponding elements of the second set of content elements, wherein replacing one or more of the elements involves replacing elements of the first set of content elements with corresponding elements in the second set of content elements without affecting the remainder of the display.

2. The method of claim 1, further comprising:
   creating within the first electronic page a frame element configured to receive an incremental update to the first electronic page.

3. The method of claim 2, further comprising:
   storing the second set of content elements in the frame element.

4. The method of claim 1, wherein the first incremental update comprises differences between the first electronic page and the second electronic page.

5. The method of claim 1, wherein the set of parameters comprises the content block identifier of a content element included in the incremental update.

6. The method of claim 1, wherein said receiving a second set of content elements comprises:
   receiving a change set comprising the second set of content elements and a unique change set identifier.

7. The method of claim 1, wherein the first incremental update includes a change set comprising differences between the first electronic page and the second electronic page.

8. The method of claim 1, wherein said replacing comprises:
   replacing an initial content element of the first set of content elements with a first element of the second set of content elements;
   wherein the content block identifier of the initial content element corresponds to the change content block identifier of the first element.

9. The method of claim 1, further comprising:
   replacing the unique content block identifiers of the initial set of content elements with the unique change content identifiers of the first set of content elements.

10. The method of claim 1, wherein said receiving a second set of content elements comprises receiving a first set of identifiers for a set of content elements common to the first page and the second page; and
    wherein said replacing comprises substituting an initial set of identifiers for the common content elements with the first set of identifiers.

11. A computer readable storage medium storing instructions that, when executed by a computer, cause the computer to perform a method of applying an incremental update to an electronic page, the method comprising:
    receiving a first electronic page comprising:
       a first set of content elements, wherein each element in the first set of content elements comprises a browser-displayable content block and a unique content block identifier;
       a set of links, wherein each link in the set of links comprises a reference to another electronic page; and
       a computer-executable function;
    modifying each link in the set of links to include:
       a call to the function; and
       a set of parameters configured to identify an incremental update to the first electronic page;
    receiving a selection of a first link in the set of links, wherein the first link references a second electronic page and identifies a first incremental update to the first electronic page;
    initiating a request for the first incremental update;
    receiving a second set of content elements in response to the request for the first incremental update, wherein each element in the second set of content elements comprises a browser-displayable content block of the second electronic page and a unique change content block identifier; and
    replacing one or more of the elements of the first set of content elements with corresponding elements of the second set of content elements, wherein replacing one or more of the elements involves replacing elements of the first set of content elements with corresponding elements in the second set of content elements without affecting the remainder of the display.

* * * * *